(12) United States Patent
Burke

(10) Patent No.: US 8,721,138 B2
(45) Date of Patent: *May 13, 2014

(54) LIGHT CONDUIT NAUTICAL NAVIGATION LIGHT

(76) Inventor: John Burke, Tampa, FL (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/271,209

(22) Filed: Oct. 11, 2011

(65) Prior Publication Data

US 2012/0039081 A1    Feb. 16, 2012

Related U.S. Application Data

(63) Continuation-in-part of application No. 12/643,816, filed on Dec. 21, 2009, now Pat. No. 8,172,437.

(51) Int. Cl.
*B60Q 1/00*       (2006.01)
*B63B 45/00*      (2006.01)

(52) U.S. Cl.
CPC ...................................... *B63B 45/00* (2013.01)
USPC .......................................... 362/477; 362/551

(58) Field of Classification Search
CPC ...................................................... B63B 45/00
USPC ................. 362/477, 551, 641, 652, 508, 581; 385/31, 37

See application file for complete search history.

(56) References Cited

U.S. PATENT DOCUMENTS

| | | | | |
|---|---|---|---|---|
| 4,389,085 A * | 6/1983 | Mori | ............................. | 359/591 |
| 4,740,870 A * | 4/1988 | Moore et al. | .................. | 362/477 |
| 5,161,874 A * | 11/1992 | Benes | .......................... | 362/552 |
| 5,339,225 A * | 8/1994 | Wiggerman | .................. | 362/477 |
| 5,477,424 A * | 12/1995 | Mocha | ......................... | 362/555 |
| 6,155,195 A * | 12/2000 | Nirenberg | ..................... | 114/343 |
| 6,272,267 B1 * | 8/2001 | Hansler et al. | .................. | 385/43 |
| 6,742,916 B1 * | 6/2004 | Dunn | ............................ | 362/477 |
| 7,758,219 B2 * | 7/2010 | Burke | .......................... | 362/477 |
| 2007/0274635 A1 * | 11/2007 | Oney | ............................. | 385/39 |

* cited by examiner

*Primary Examiner* — Ali Alavi

(57) ABSTRACT

A light conduit nautical navigation light with improved usable life and reliability. It replaces electrical energy coupling by light energy coupling, thereby eliminating electrical contact corrosion problems. It further offers a more robust light emitting structure due to its solid structure.

20 Claims, 13 Drawing Sheets

LIGHT CONDUIT NAUTICAL NAVIGATION LIGHT

CROSS-REFERENCE TO RELATED APPLICATIONS

This application is a continuation-in-part of application Ser. No. 12/643,816 filed on Dec. 21, 2009 which claims the benefit of application Ser. No. 12/174,120 filed on 16 Jul. 2008. Application Ser. No. 12/174,120 issued as U.S. Pat. No. 7,758,219 on 20 Jul. 2010.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to nautical lights for navigational purposes. Some nautical navigation lights are detachable from the base, which for boat applications allows the lights to be stored out of the way, an advantage for many daytime activities and boat storage. Other nautical navigation lights are fixed to the base. Nautical navigation lights may be a single color, such as typically used for boat stern lights and navigation buoys, or two colors such as used in some boat bow lights and some bridge structures. For boat stern lights and navigation buoys, a single color is visible for typically all directions. For the case of boat bow lights and some bridge structures, one color of light is visible from one direction and another color light is visible from an opposing direction. The two color lights may be two discrete light sources located on opposing sides or one two color bifurcated source. Some nautical navigation lights flash at a predetermined rate. Buoys are one example where flashing lights are common.

2. Background Art

Detachable nautical navigation lights typically consist of a base which is mounted to a structure and a pole which mechanically couples to the base. The pole has a light emitting device (typically an incandescent bulb) at the distal end. Power to energize the bulb is coupled via electrical contacts at the base and at the bulb socket at the distal end of the pole. Fixed in place nautical navigation lights have a similar construction with typically shorter poles and without the base electrical contacts.

Electrical contacts are composed primarily of copper and copper alloys. Although weather covers are typically provided to cover the electrical contacts, water intrusion almost always occurs. Copper electrical contacts exposed to moisture leads to corrosion and eventual electrical failure of the contacts. The problem is particularly acute in marine environments.

Several US patents describe prior art systems which are related but differ from the invention.

U.S. Pat. No. 4,389,085 to Mori describes a fiber optic system which collects and distributes sunlight.

U.S. Pat. No. 4,740,870 to Moore discloses a central light source which is transmitted to different areas of a boat via fiber optic cabling.

U.S. Pat. No. 5,161,874 to Benes describes a remote illumination system that utilizes a single light source and a light pipe to transmit the light to some remote locations from the source.

U.S. Pat. No. 5,339,225 to Wiggerman is a boat stern light design that illuminates the length of the pole, as opposed to just having a light at the distal end.

U.S. Pat. No. 6,155,195 to Nirenberg discloses a telescoping stern light that can be retracted out of the way when not in use.

U.S. Pat. No. 6,742,916 B1 to Dunn describes a fiber optic cabling system for the sides of boats which is intended illuminate said side for safety or enjoyment purposes.

BREIF SUMMARY OF THE INVENTION

Previous nautical navigation light designs utilize electrical contacts between the base and detachable pole and between the bulb socket and bulb. The contacts connect the electrical power present in the base component to wires within the pole, which in turn transmit the electrical power to a distal end socket mounted light bulb. Non-detachable designs are similar, but without the base electrical connection. Both types share the light bulb socket to bulb electrical connection.

The invention eliminates the electrical contacts corrosion problem of previous designs by transmitting light instead of electrical current in the structure external to the base. It replaces the electrical coupling at the proximal end of a detachable light pole with light coupling of the base and light conduit. It also eliminates the electrical contacts of the bulb and socket at the distal end common to detachable and fixed designs with light conducted within and emitted from the light conduit distal end. The elimination of electrical contact corrosion greatly increases the reliability of the nautical navigation light. One embodiment further increases reliability by having a redundant light source or sources, light driver or drivers or combinations thereof. Briefly, the redundant version has a circuit that senses the failure of the primary light source and switches to the redundant system.

In the broadest form, the invention comprises a base, an electrical power connection, a light driver device or devices providing an electrical power conditioning, one or multiple light source or sources of one or multiple colors, a light conduit assembly comprising one or more adjacent light bars, that mounts to the base, and a mechanism to redirect and emit the transmitted light out of the light conduit.

The invention is applicable to any nautical navigation light application. These include, but are not limited to, boats, barges, buoys, jetties, navigation structures or any watercraft. Nautical navigation structure is defined broadly here to include all of the preceding and any other structure or component which could utilize a nautical navigation light.

The base provides mechanical mounting and light coupling between the light source or sources and the light conduit. It also provides mounting to or within a nautical navigation structure. In various embodiments, the base may have the light source and light driver device incorporated into it, or one or both may be external to it.

The light source may be formed from a multitude of types of visible light emitting devices. The light source may be comprised of one or more light emitting devices, which may have one or more colors. One, but not the only, example of light source devices is a high intensity LED. Another example is multiple LEDs. Any light emitting device or devices suitable for the application could be used. The light sources may be comprised of one set for typical applications, or primary and redundant sets of light sources for higher reliability applications.

The electrical power may be from any suitable source which can be used by the light driver to energize the light source. In one embodiment, the source is the boat's electrical power system. In another, the electrical power source is a battery or batteries.

The light driver device circuit can consists of any device capable of converting the incoming electrical power to a form required by the light source. Examples of such devices range from a resistor to switching power topology circuits. The power from the light driver device or devices to the light source or sources may be continuous, modulated, cycled on and off for various time periods, or any method suitable to control the light source for its intended purpose. As in the light sources, the light drivers may be comprised of one set for typical applications, or primary and redundant sets of light drivers for higher reliability applications.

A flashing system may also be incorporated in the invention. The flashing system controls the amount of time in a period that the light is emitted. Examples of flashing nautical navigation lights are some buoys and channel markers. Typically they flash on and off for a designated time, which is published in nautical charts. The flashing makes identification of a particular buoy or channel marker easier at night or in poor visibility conditions. Various means may accomplish the flashing, such means comprise mechanical timers, analog electronic circuits or microprocessor based circuits.

For high reliability applications, a means to detect the primary light set failure and to turn on the redundant light set is included. Various means may be used to detect the primary set failure. Some examples include, but are not limited to, monitoring the primary set light, light source circuit parameters or light driver circuit parameters. Energizing the redundant set when the primary set fails can also be realized in multiple ways. Some examples include, but are not limited to, electromechanical relays, analog electronic circuits, digital circuits and microprocessor based circuits are all capable of the function.

The light conduit may also take a multitude of embodiments. The light conduit comprises one or more adjacent bars. Each bar is essentially a large diameter optical fiber or light pipe, which efficiently conducts and largely contains light within itself. A bar, is defined here as a solid, more or less rigid object with a uniform cross-section along its length and any suitable shape. Examples of shapes include, but are not limited to, cylindrical half-round, cylindrical, square, triangular and rectangular bars and combinations thereof. The cross sectional area of the light conduit and length of the light conduit is determined by the particular application. The light conduit may or may not have an additional external opaque covering.

The light redirection mechanism for the light traveling within the light conduit may also take multiple forms. A fundamental characteristic of the mechanism is reflection and redirection of the conduit light. The horizontal light emission may be comprised of any degree pattern up to and including 360 degrees. It may also comprise multiple segmented arcs. Multiple segmented arcs means, for the purposes of this invention, multiple geometric arcs where emission is allowed, not allowed or attenuated. The vertical emission pattern is comprised of an angle up to and including 180 degrees, where 0 degrees is the direction along the conduit towards the base, or multiple segmented arcs.

In the following section, one embodiment of the invention is explained in detail. The invention is not intended to be limited in its application to the details of construction and to the arrangements of the components described in the following description or illustrated in the drawings. The invention is capable of other embodiments and of being practiced and carried out in various ways.

The phraseology and terminology employed herein are for the purpose of description and should not be regarded as limiting.

It is the intention of the invention to provide a new nautical navigational light system which overcomes the disadvantages of previous systems which is not anticipated, rendered obvious, suggested, or even implied by any of the prior art nautical navigation light systems, either alone or in any combination.

BRIEF DESCRIPTION OF THE DRAWINGS

The following drawings illustrate the best modes presently contemplated for carrying out the present invention (Preferred Embodiment).

DETAILED DESCRIPTION OF THE INVENTION

Principle of Operation

Nautical navigation lights have various configurations. There are discrete lights that have a single color with emission patterns up to 360 degrees, while others limit their emission pattern to 180 degrees or other values. Examples of a single color 360 degree (typical) emission pattern are a boat stern light and a navigation buoy. A discrete port or starboard bow light is an example of a single color light with a 180 degree (typical) emission pattern.

Nautical navigation lights may also combine two or more colors in one light. For the two color case, the light typically emits one color in a 180 horizontal degree section and another color in the opposing 180 degree section. Examples of the two color combined light include a combined port and starboard bow light and a two color light found on some bridges over the channel. One example of a three color light comprises a port bow, starboard bow and stern light combined.

Another characteristic of nautical navigation lights is that some flash on and off with a defined duration. Examples of flashing nautical navigation light comprise buoys and some navigation structures.

In one configuration, the invention offers a redundant light system, increasing reliability for applications where that is an asset for safety or other reasons.

The invention provides all of the above configurations and others with multiple colors and various emission patterns.

Figure 1:
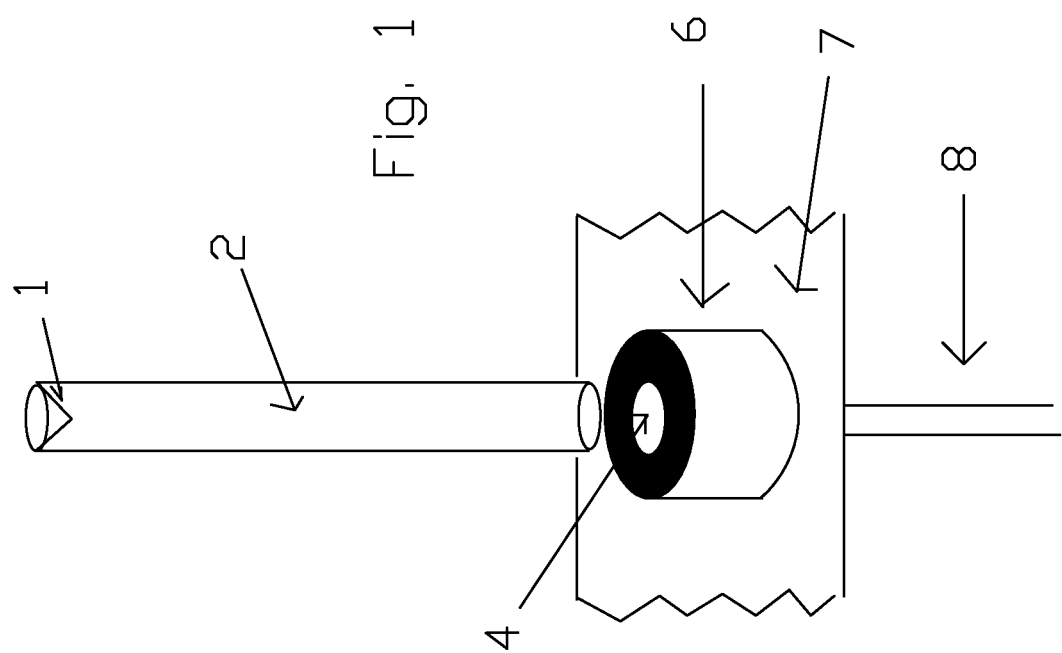
FIG. 1 Perspective component view of the single bar cylindrical configuration.
Figure 2:
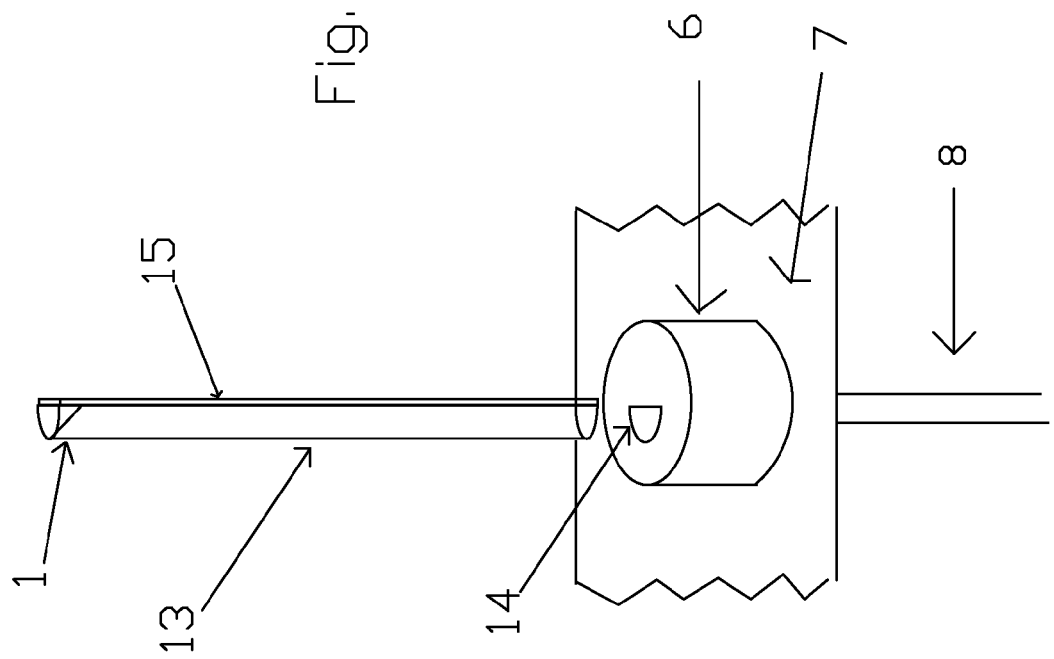
FIG. 2 Perspective component view of the single half-round bar configuration.
Figure 4:
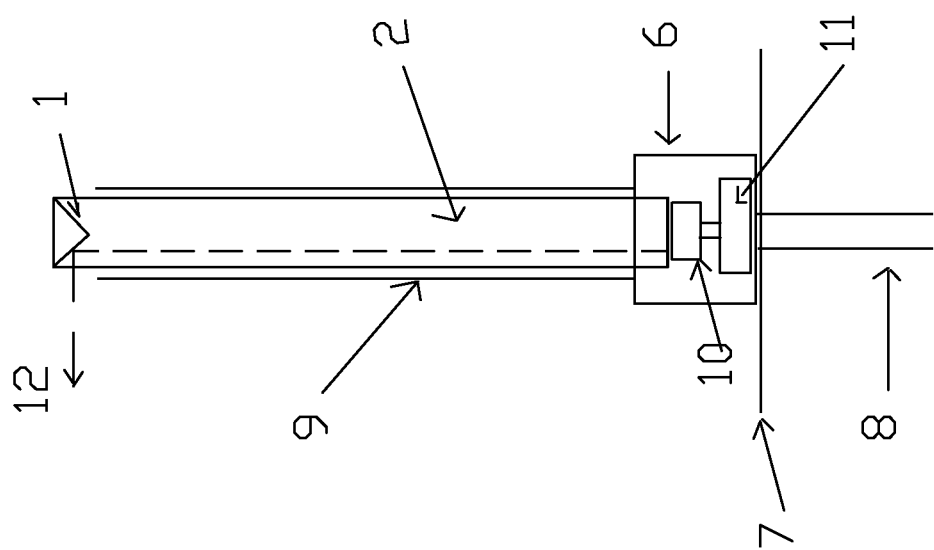
FIG. 4 Cross Section View of the single bar cylindrical configuration.
Figure 5:
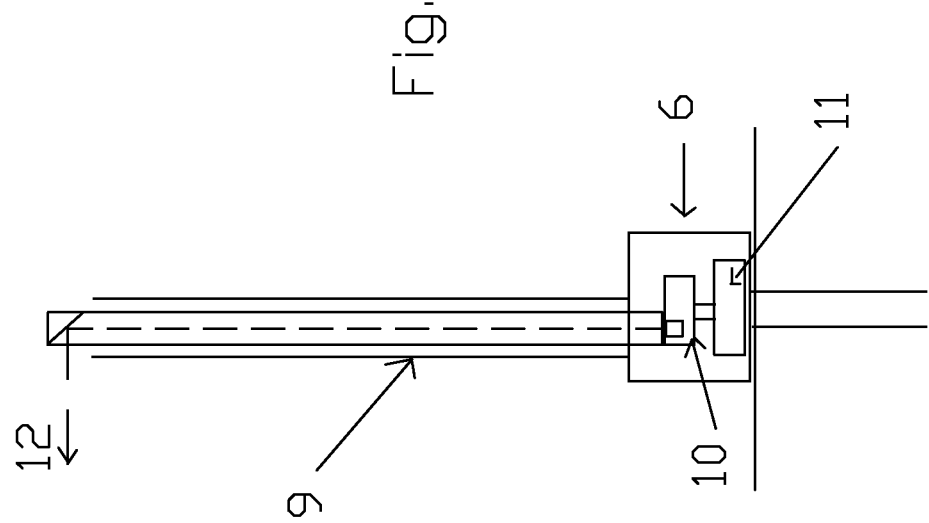
FIG. 5 Cross Section View of the single half-round bar configuration.

Briefly, one or more bars in the light conduit couple the light source(s) light to a mechanism at the top of light conduit that emits the light in the desired pattern. Light, for the purposes of this invention, is comprised of any wavelength (color) or wavelengths (colors) in the visible spectrum.
Refer to FIGS. 1 through 13 for the following description.
The Components:

The components of one configuration of the preferred embodiment are illustrated in FIG. 1: a base 6 mounted to or within the boat, buoy or navigation structure or component 7, a single cylindrical bar light conduit 2, a redirection and emission device 1, one or more light sources 10 FIG. 4 coupled to the light conduit, one or more light drivers 11 to energize the light sources and a connection to an electrical power source 8.

The base 6 may be constructed of any material suitable for the marine environment. Examples include aluminum, stainless steel and a variety of plastics and composites. The preferred embodiment is comprised of aluminum alloy. The base 6 also comprises a coupling of the light source or sources 10 and the light conduit bar 2 or bars.

Figure 3:
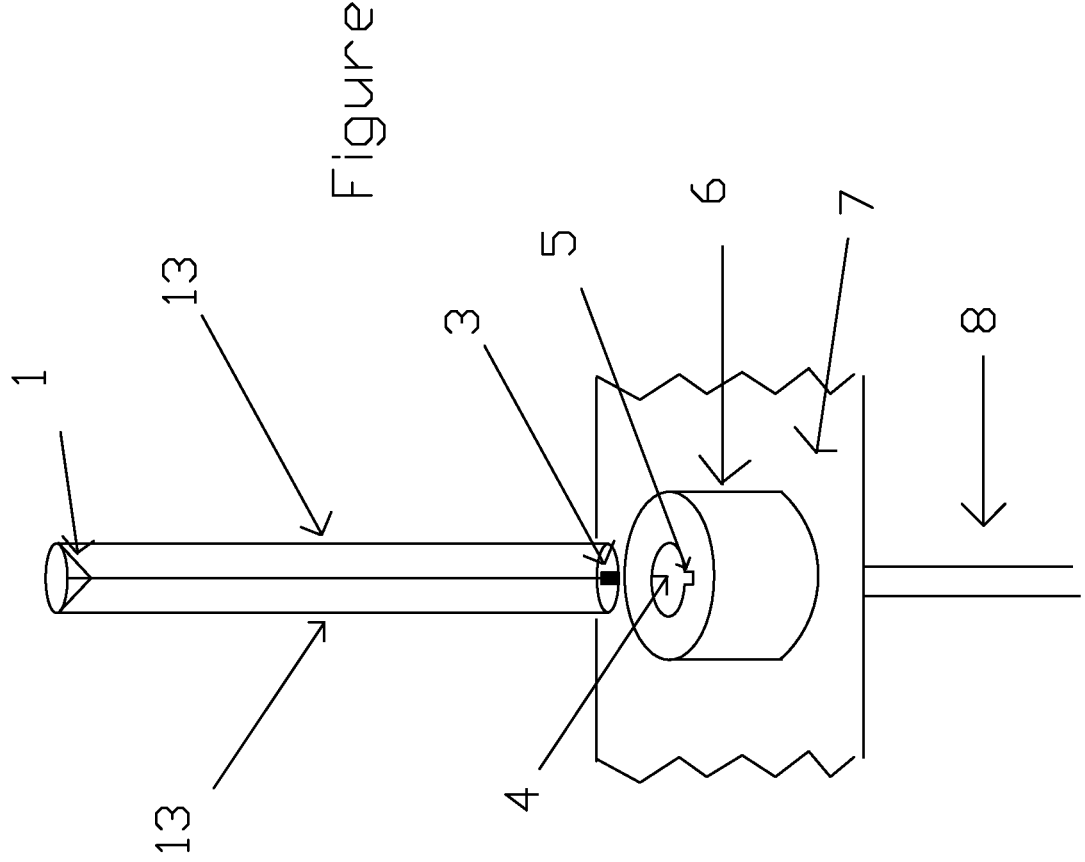
FIG. 3 Perspective component view of the dual bar cylindrical configuration.

The light conduit assembly may be configured as one bar 2 of FIG. 1, two bars 13 of FIG. 3 or multiple adjacent bars with an optional light barrier 15 between adjacent bars. The light barrier is opaque to light and prevents light from being emitted along the adjoining surfaces of the light conduit bars. The light conduit may be removable or fixed to the base.

The configuration of a single bar light conduit is illustrated via example in FIG. 1. The single bar cylindrical light conduit 2 in this case emits light in a 360 degree pattern and therefore does not require a mounting alignment mechanism for its light emission pattern or light source or sources coupling. Consequently, the base mounting socket 4 in this example does not have a polarizing mechanism. A variant on the single bar light conduit is illustrated by the example of a half cylindrical bar 13 light conduit illustrated in FIG. 2. It requires alignment of its light emission pattern in respect to its mounting structure, but typically not in regard to the light source or sources. The alignment, in this case, is accomplished by the shape of the base mounting 14.

Figure 6:
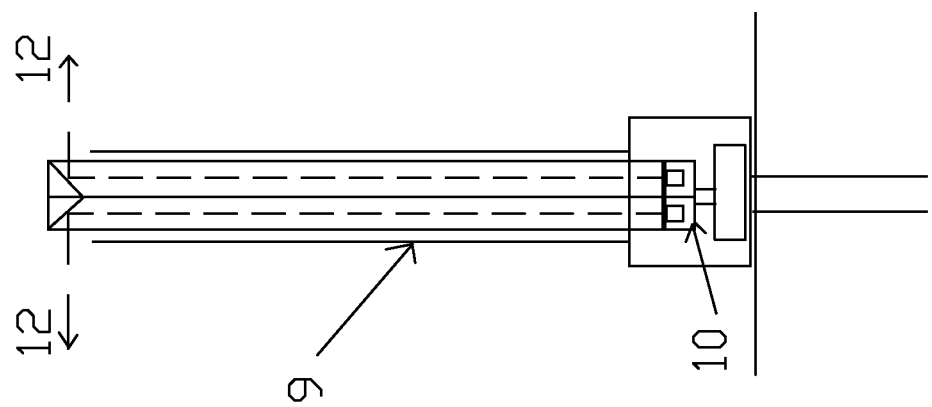
FIG. 6 Cross Section View of the dual bar cylindrical configuration.
Figure 7:
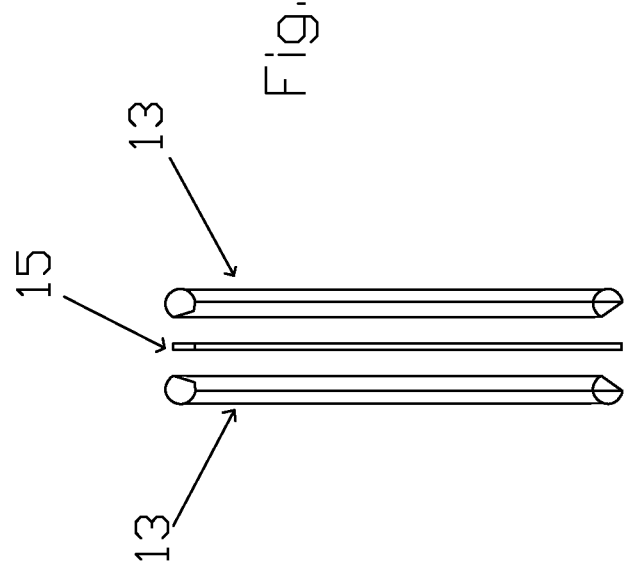
FIG. 7 Exploded perspective view of dual light bar conduit component

The configuration of multiple adjacent bars is illustrated via the case of two adjacent bars FIG. 3 and FIG. 6. Cases of more than two adjacent bars can be readily extrapolated from the case of two. A means of aligning the bars within the light conduit with their respective light sources 10 and possibly with the desired light emission pattern relative to the base is needed. FIG. 3 illustrates one means of aligning a two bar cylindrical light conduit. A polarizing tab 3, which mates with the corresponding notch 5 in the base 6, at the proximal end of the two bar light conduit assembly, aligns the two bars 13 within the light conduit with the corresponding light sources 10 and the base 6.

The light conducting material of the preferred embodiment light conduit bars 2,13 is acrylic. Alternative materials include, but are not limited to glass, polycarbonate or combinations thereof, or any optically transparent material that efficiently conducts light. The cross section size of the light conduit is not critical and is primarily determined by the proximal end surface area needed by the light conduit bars 2,13 or the dual 13 light conduit bars to efficiently couple their respective light source or sources 10 radiation pattern. Again, extrapolation to more than two light bars is easily done. Another diameter consideration is structural integrity, larger diameters being sturdier.

The length of the light conduit assembly and combination light conduit assembly is likewise not critical, and can be varied to meet the height requirements of the application. The primary limitation on the length of the light conduit assembly is light intensity loss, however that can be offset by higher light sources intensity. The preferred embodiment offers lengths comprised of one to forty-eight inches for the light conduit assembly. The dimensions chosen for the preferred embodiment of the light conduit assembly are not intended to be a limitation in any sense, since the length and diameter of the light conduit assembly can be of nearly arbitrary dimensions, as needed by the application.

The optional light barrier 15 construction may be comprised of foil, film, coating, deposition or combinations thereof of light opaque material. Examples of such materials are various metals, including aluminum, steel, copper, opaque plastics, composites or combinations thereof. In the preferred embodiment, 0.002 inch thick aluminum foil is used for the light barrier 15.

The distal end of the light conduit assembly has a light redirection device 1 to redirect the light traveling in the light conduit bars outward from the light conduits in the desired light emission directional pattern. The redirection device may be internal 1 (FIG. 1) to the light conduit or external 19 to it (FIG. 8), or a combination thereof. In the case of the integral light redirection devices 1, each redirection device is comprised of an optical discontinuity with an optional additional reflective material at the exterior surface of said optical discontinuity.

Figure 8:
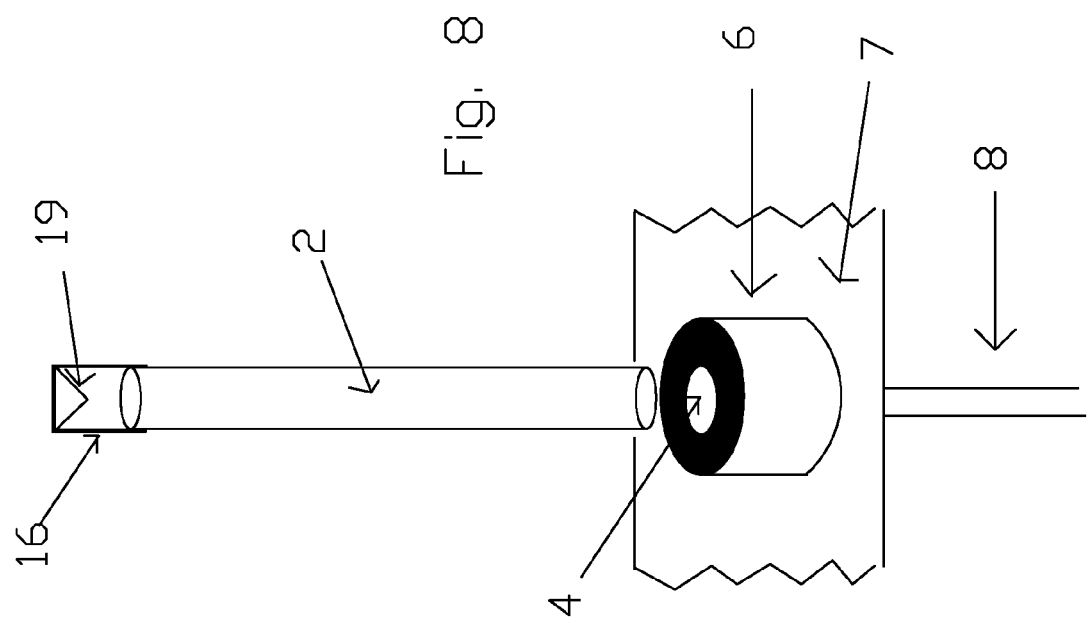
FIG. 8 Perspective component view of the single bar cylindrical configuration with external reflector FIG. 9 Cross Section View of the single bar cylindrical configuration with external light driver, light source and flash controller.

For the external case, the light redirection devices are comprised of optical discontinuities in the form of reflective surfaces external 19 to the distal end of the light conduits (FIG. 8). Whether the light redirection occurs integral (internal) to or external to the light conduit, the light redirection and emission function is fundamentally the same.

The light redirection device may consist of any material or combinations of materials that efficiently redirect the light. The integral redirection device 1 is a boundary between materials with differing indexes of refraction and an optional additional reflective surface. More specifically, the light conduit material side of the boundary has a relatively high index of refraction and the other side of the boundary has a relatively low index of refraction. The reflective material used by both the optional additional reflective surface and the external redirection device 19 is comprised of various metal, plastic, composites or combinations thereof that have sufficient light reflection properties. The reflective materials can take the form of films, foils, depositions or combinations thereof.

In one configuration of the preferred embodiment, the light conduit bar 1 has a shaped optical discontinuity surface integral to the distal end to form the light redirection devices 1. One side of the surface is comprised of acrylic and the other side is comprised of aluminum, air or combinations thereof, thereby comprising the optical discontinuity. There is an additional reflective surface present at the exterior surface of the cone comprised of aluminum foil to enhance light reflection.

In another configuration of the preferred embodiment, the light conduit bar has a shaped optical discontinuity surface external to the distal end to form the light redirection devices. FIG. 8 illustrates an external light redirection device 19 mounted within a mounting structure 16 that connects to the distal end of the light conduit 2.

In the configuration of the preferred embodiment shown in FIG. 1, the light redirection devices 1 of the light conduits form an angle of ninety degrees. Said ninety degree angle creates a forty five degree angle of incidence between the redirection device surface and the impinging light 12. However, the ninety degree surface angle is not intended to limit the possible angles in any way and any angle that redirects the light in the desired pattern is acceptable.

The single bar configuration FIG. 4 light conduit assembly and the two bar configuration FIG. 6 light conduit assembly may have an optional opaque outer covering 9. Again, the optional outer covering can easily be extrapolated to more than two bar configurations. The outer covering 9 may be comprised of any light opaque material suitable for the application, including, but not limited to, aluminum, copper, steel, opaque plastics, opaque coatings or combinations thereof. In the preferred embodiment, an aluminum outer covering 9 is used.

In the case of single bar light conduit configuration FIG. 4, typically there is one light device of one color comprising the light source 10. However, multiple colors and/or devices may also comprise the light source 10. In the case of the two bar light conduit configuration FIG. 6, typically there are two light devices of different colors comprising the light source 10. However, multiple colors and/or devices may also comprise the light source 10 for the two bar configuration as well. As in other aspects of the invention, the two bar case of the light conduit configuration can easily be extrapolated to more than two bars in the light conduit.

The light emitted from the light source(s) 10 is coupled through the base 6 into the proximal end of the light conduit bar 2. FIG. 4 depicts the configuration where the light source (s) 10 and light driver(s) 11 are internal to the base and located at the bottom end of the light conduit assembly socket 4 so as to minimize physical separation between the light source(s) 10 and the installed light conduit proximal end.

Figure 9:
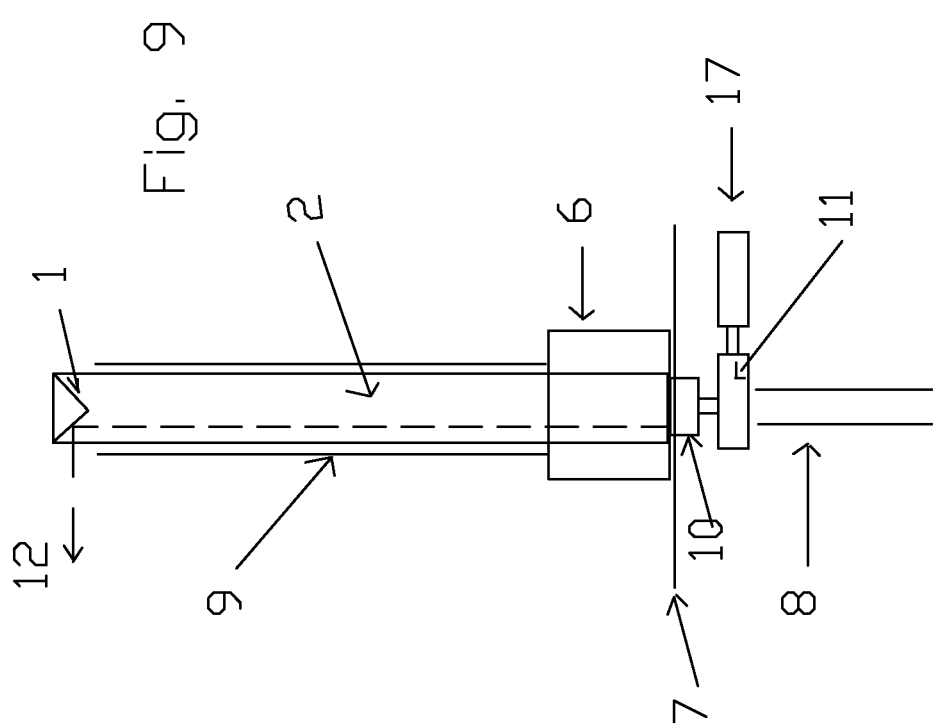
Figure 10:
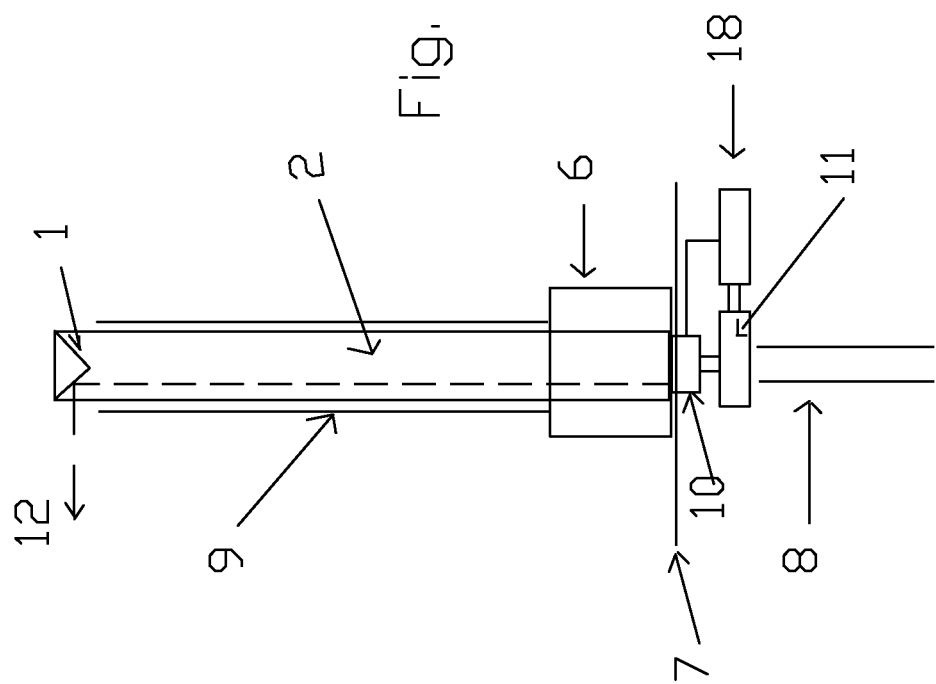
FIG. 10 Cross Section View of the single bar cylindrical configuration with external light driver, light source and redundant controller FIG. 11 Schematic of Switching Power Supply Based Light Driver and Light Source FIG. 12 Schematic of Switching Power Supply Based Light Driver, Light Source and Flash Controller.

FIG. 9 depicts the configuration where the light source(s) 10 and light driver(s) 11 are external to the base 6. Here the light source(s) 10 are shown at the bottom end of the base 6, again, so as to minimize physical separation between the light source(s) 10 and the installed light conduit bar proximal end. FIG. 9 also depicts the flashing configuration with the flash controller 17. FIG. 10 depicts the redundant light configuration with the redundant controller 18. A more detailed description of the flash controller and the redundant controller circuits is in the electrical section.

In the preferred embodiment, the recessed light conduit assembly socket 4 diameter is such as to provide a slip fit, or nearly so, to the light conduit assembly. The slip fit mechanical coupling design approach is applicable to the removable light conduit configuration as well as the fixed in place configuration. For the removable configuration, the slip fit offers secure attachment with ease of removal. For the fixed configuration, mechanical attachments comprising adhesives, mechanical fasteners or combinations thereof can be used to permanently secure the light conduit in the slip fit socket. A plethora of mechanisms for mechanical coupling of the base and light conduit are possible. Some possible light conduit to base coupling mechanisms comprise screw threads, twist and lock, and compression based locking mechanisms. Alternatives to the recessed socket coupling configurations comprise a socket projecting above the base surface, a minimum or no socket flush mount to the base, and reciprocal socket and plug configurations of the various aforementioned base and light conduit configurations.

In the case of the combination configuration FIG. 3, a polarizing notch 5 mates with the polarizing tab 3 of the two light conduit assembly, ensuring alignment of the two light sources 10 of FIG. 6 and the two corresponding bars 13, 13 of the light conduit.

Description of Operation
Electrical Section

The light driver 11 has a connection to an electrical power source 8 comprising wires, terminals, connectors or combinations thereof. Said electrical power source may have a multitude of embodiments. In general, any power source capable of providing the necessary electrical power is acceptable. For the preferred embodiment, the electrical power source is comprised of an electrical power system, a battery or batteries or combinations thereof.

In the preferred embodiment, each light source 10 is comprised of a state-of-the-art high intensity LED or multiple LEDs, available from multiple semiconductor manufacturers. The invention anticipates continuing advancements in LED technology which will provide more light output with less power consumption, hence improving overall efficiency and enabling longer light conduit assembly lengths, lower power consumption or combinations thereof. Light source 10 embodiments comprise solid state devices such as LED(s), LASER(s), incandescent bulb or bulbs, florescent bulb or bulbs, or combinations thereof.

The light sources 10 are driven by the light source driver device 11, which conditions the electrical power presented via the electrical connection 8 to the electrical drive requirements of the light sources 10.

Figure 11:
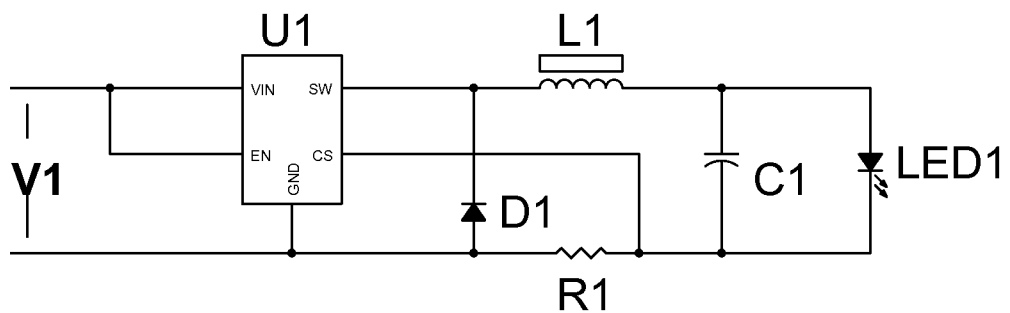

In the preferred embodiment, the LED light source driver device 11 can be comprised of a voltage dropping resistor, a linear power supply topology, a switching power supply based design or combinations thereof. For most applications the switching power supply based design is preferred due to its low power dissipation and accurate LED current control. Those skilled in the art will recognize the light driver circuit depicted in FIG. 11 as an example of a switching power supply based LED driver circuit. FIG. 11 depicts the classical elements: a voltage source V1, a power switch and PWM IC U1, an energy storage section formed by the inductor L1 and capacitor C1, a current sense resistor R1 and a current "catching" diode D1. The light source LED1 (10) is the circuit "load". U1 has pins VIN—the voltage input, SW—power switch output, CS—current sense input and GND—circuit ground. Multiple semiconductor manufactures provide switching power supply based LED driver circuits. The voltage dropping resistor or linear supply is suitable to applications were the input voltage and LED current will not result in excessive power dissipation.

Figure 12:
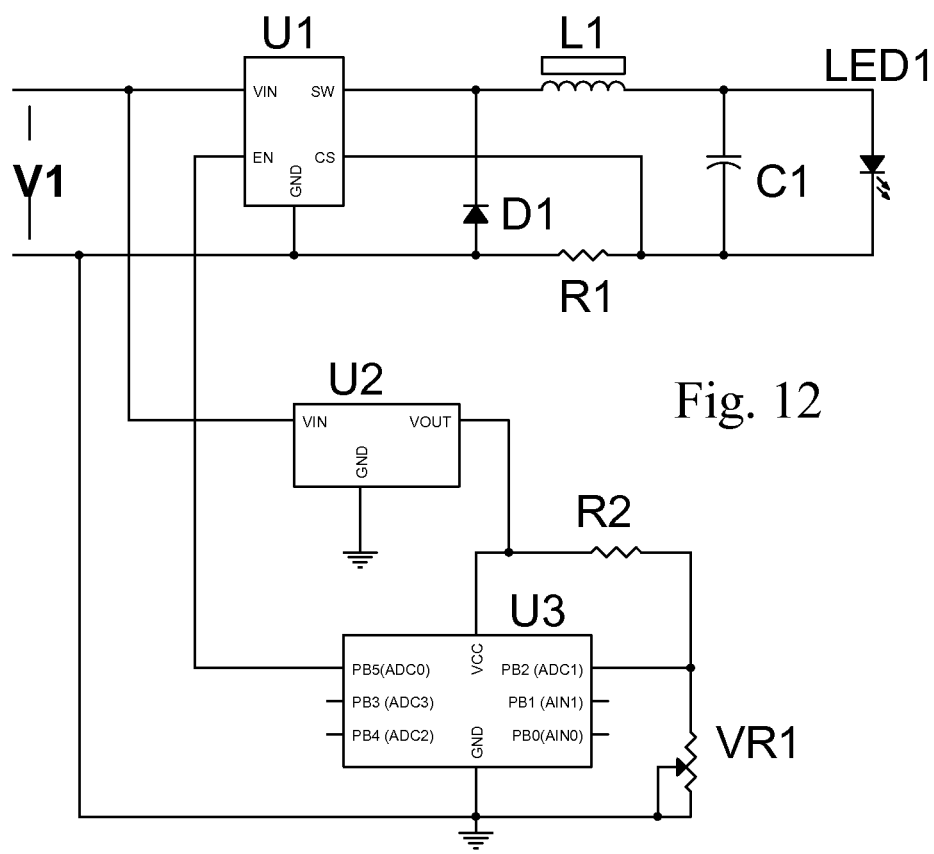
Figure 13:
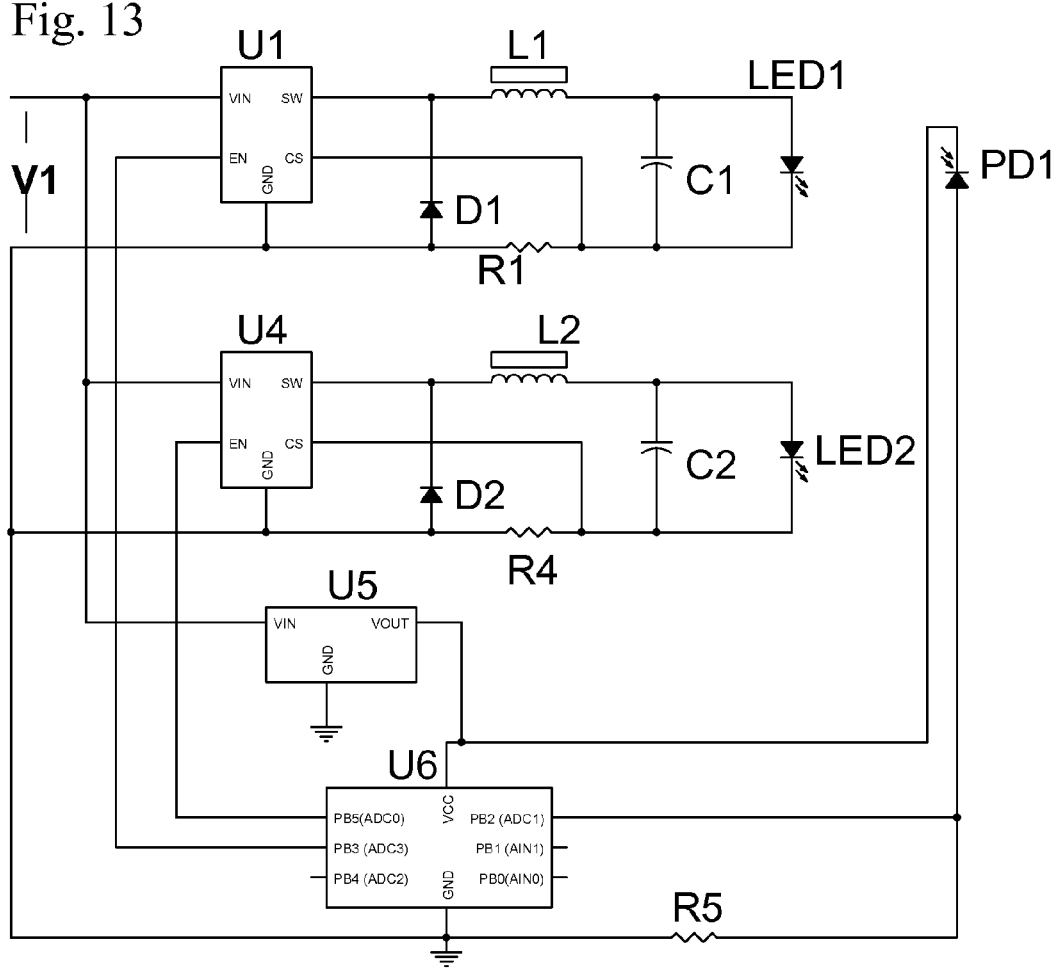
FIG. 13 Schematic of Switching Power Supply Based Light Drivers, Light Sources and Redundant Light Controller.

The flashing version of the preferred embodiment has a microcontroller and potentiometer added to the basic version of FIG. 11 to allow adjustable flashing period. Referring to FIG. 12, the microcontroller U3 has an integral analog to digital converter which converts the variable voltage of the voltage divider formed by R2 and VR1 to digital form. The light driver device component U1 is enabled and disabled by the microcontroller U3 so as to control the light flash according to the voltage set by the adjustable resistor VR1. The three terminal linear voltage regulator U2 converts the input voltage V1 to a level required by the microcontroller U3. Microcontrollers suitable for the function of U3 are available from multiple semiconductor manufacturers. U3 is an ATTiny13 series part available from Atmel. U3 has pins VCC—the voltage input, PB2 (ADC1)—ADC input, PB5 (ADC0)—digital output enable for the light driver and GND—circuit ground. Likewise, the tree terminal regulator U2 can be sourced by multiple vendors. U2 is a 78L05 series part with pins VIN—the voltage input, VOUT—the voltage output and GND—circuit ground The redundant light source version of the preferred embodiment has a redundant light driver and light source, a microcontroller and photodiode to added to the basic version of FIG. 11 to allow monitoring of the primary light source and enabling of a secondary light source system. Referring to FIG. 13, the primary and redundant light sources and driver have components PWM IC (U1, U4), energy storage components inductors (L1, L2) and capacitors (C1,C2), current sense resistors (R1,R4), current "catching" diodes (D1,D2) .and light sources (LED1, LED2). The primary and redundant light driver and light source function are the same as described in the light source and light driver of FIG. 11, with the exception that the enabling of the light source drivers are controlled by a microcontroller. The photodiode PD1 is illuminated by the primary light source LED1 and generates a light dependent current, which forms a light dependent voltage across R5. The microcontroller U6 has an integral analog to digital converter which converts the light dependent voltage at R5 to digital form. The primary light driver device U1 and redundant light driver device component U4 are enabled and disabled by the microcontroller U6 so as to control the redundant light source function according to the status of the primary light source light emission. If the primary light source emission fails, the microcontroller enables the redundant light source driver. The three terminal linear voltage regulator U5 converts the input voltage V1 to a level required by the microcontroller U6. Microcontrollers suitable for the function of U6 are available from multiple semiconductor manufacturers. U6 is an ATTiny13 series part available from Atmel. U6 has pins VCC—the voltage input, PB2(ADC1)—ADC input, PB5(ADC0)—digital output enable for the redundant light driver, PB3(ADC3)—digital output enable for the primary light driver and GND—circuit ground. Likewise, the tree terminal regulator U5 can be sourced by multiple vendors. U5 is a 78L05 series part with pins VIN—the voltage input, VOUT—the voltage output and GND—circuit ground In the preferred embodiment, the LED light sources 10 and the LED light source driver device 11 are thermally conductive epoxy encapsulated within the base or in an external module to prevent water damage and conduct heat away from the electrical components. There is no inherent need to thermal epoxy encapsulate the light source(s) 10 and light source driver device(s) 11. Other embodiments are comprised of sealed enclosures, silicone or other gel fillings, dielectric grease or combinations thereof. The light source(s) and light driver(s) may each be independently or together incorporated in to the base or external to the base.

Optical Section

The following description of the optical section uses the single bar light conduit for illustration (FIGS. 1 and 4). The same principle of operation is used in all the various configurations and readily extrapolates to multiple bar light conduit configurations.

In the preferred embodiment, the light 12 emerging from the light source 10 is optically coupled via the base 6 into the light conduit bar 2 of the light conduit assembly.

The light 12 coupled into and traveling within the light conduit bar 2, experiences nearly total internal reflection, maximizing optical power transmission to the distal end. The phenomena of total internal reflection is well know to those skilled in the field of fiber optics and relies on the light conduit bar 2 (core) having a higher index of refraction than the surrounding media, which is comprised of air, an outer covering 9 (cladding) or combinations thereof.

Materials that have good light transmission properties and can be made to provide nearly total internal reflection are candidates for the light conduit bar 2. Such materials include, but are not limited, acrylic, glass and polycarbonate or combinations thereof. The light conduit bar 2 in the preferred embodiment is comprised of acrylic, which has excellent light transmission properties and is compatible with marine conditions.

For the preferred embodiment, the aluminum outer covering 9 of the light conduit 2 further increases the internal reflection and blocks light from emerging along the periphery of the light conduit assembly 2. The aluminum outer covering 9 has an index of refraction lower than that of the light conduit bar 2 minimizing light loss. The outer covering 9 also provides protection to the light conduit assembly 2 from mechanical stress.

The distal end of the preferred embodiment light conduit assembly 2 with internal light redirection has a cone shaped light redirection device 1 in the light conduit bar 2. The light 12 traveling within the light conduit 2 is reflected by the cone light redirection device 1 and is emitted from the light conduits bar 2. Since the light 12 traveling in the light conduit bar 2 impinges essentially the entire reflective surface of the cone light redirection device 1, the light 12 is emitted in a one hundred eighty degree horizontal pattern around the distal end of each of the light conduit 2. The light redirection device 1 can be integral to the light conduit bar 2 (as in the case of the preferred embodiment) or can be external at the distal end of the light conduit bar 2.

In the case of external light redirection shown in FIG. 8, the light 12 traveling in the light conduit 2 emerges from the light conduit bar material at the distal end and continues on to encounter the external light redirection device(s) 19. It is there that the light 12 is redirected in the same manner as in the internal case described above.

The horizontal light emission pattern comprises three hundred sixty degrees, a subset of three hundred sixty degrees or multiple segmented arcs. Modification of the inherent horizontal light emission pattern of the light redirection device 1 for the light conduit bar 2 is possible by coverings selectively blocking or attenuating the light 12. The vertical emission pattern of the light 12 can be as much as one hundred eighty degrees or multiple segmented arcs. The vertical emission pattern is largely controlled by the angle of the light redirection devices 1 surface to the light 12 traveling in the light conduits 2 and can be further modified by selectively blocking or attenuating the light via coverings. Said coverings comprise light opaque, light attenuating or combinations thereof materials. Examples of such materials are, aluminum, copper, steel, opaque or light attenuating plastics, opaque or light attenuating coatings, or combinations thereof. In the preferred embodiment, aluminum foil coverings are used.

In the preferred embodiment, the cone shaped light redirection devices 1 were chosen for their uniform light emission characteristic, however it is anticipated that other shapes for the redirection devices 1 could be utilized, depending on the desired light emission pattern.

In the preferred embodiment, the light emitted from the optical discontinuity 1 of the light conduits 2 is somewhat diffused by its nature. However, it may be desirable to have a more diffused light. To that end, the light conduits may have a light diffuser. The light diffuser could have various embodiments including, but not limited to, a diffused surface of the light conduit bar or bars, an external to the bar or bars diffused covering or combinations thereof.

The invention claimed is:

1. Nautical navigation light system comprising:
   a light conduit, said light conduit structure comprising one bar or multiple bars, a proximal end operable to provide light coupling and mechanical coupling, and a middle portion whose combination of structure and material make it operable to efficiently conduct and confine light to the distal end;
   a base, said base comprising material suitable for nautical applications, a structure operable to mechanically couple the light conduit proximal end to a nautical navigation structure and operable to facilitate light coupling into the light conduit proximal end;
   one or multiple light sources, each light source operable to project light into the light conduit proximal end, and comprising electrical to light energy conversion;
   one or multiple light driver devices, each light driver device operable to connect to an electrical power source and one or multiple light sources, and comprising power conversion and control for one or multiple light sources;
   and a reflective surface or surfaces in proximity or integral to the distal end of the light conduit bar or bars, said reflective surface comprising an angle-of-incidence to the conducted light operable to redirect and emit the light and a shape operable to emit light in the desired emission pattern.

2. The base of claim 1, wherein the mechanical coupling comprises a socket operable to receive the light conduit proximal end.

3. The light driver device or devices of claim 1, wherein the light driver device or devices comprises a switching power supply topology circuit.

4. The light source or sources in claim 1, wherein the light source or sources comprise a LED or LEDs.

5. The light conduit of claim 1, wherein each light conduit bar incorporates a light barrier on a portion of the bar surface.

6. The light conduit of claim 1, wherein the light conduit assembly has an outer covering over a middle portion of the light conduit.

7. A flashing nautical navigation light system comprising:
   a light conduit, said light conduit structure comprising one bar or multiple bars, a proximal end operable to provide light coupling and mechanical coupling, and a middle portion whose combination of structure and material make it operable to efficiently conduct and confine light to the distal end;
   a base, said base comprising material suitable for nautical applications, a structure operable to mechanically couple the light conduit proximal end to a nautical navigation structure and operable to facilitate light coupling into the light conduit proximal end;
   one or multiple light sources, each light source operable to project light into the light conduit proximal end, and comprising electrical to light energy conversion;
   one or multiple light driver devices, each light driver device operable to connect to an electrical power source and one or multiple light sources, and comprising power conversion and control for one or multiple light sources;
   a light flashing control device operable to enable and disable light emission and comprising an adjustable flash period;
   and a reflective surface or surfaces in proximity or integral to the distal end of the light conduit bar or bars, said reflective surface comprising an angle-of-incidence to the conducted light operable to redirect and emit the light and a shape operable to emit light in the desired emission pattern.

8. The base of claim 7, wherein the mechanical coupling comprises a socket operable to receive the light conduit proximal end.

9. The light driver device or devices of claim 7, wherein the light driver device or devices comprises a switching power supply topology circuit.

10. The light flashing control device of claim 7, comprising a microcontroller and a device to present a variable level input to the microcontroller, said variable level representing the desired flash period, said microcontroller operable to enable or disable the light driver device or devices depending on said variable input.

11. The light source or sources in claim 7, wherein the light source or sources comprise a LED or LEDs.

12. The light conduit of claim 7, wherein each light conduit bar incorporates a light barrier on a portion of the bar surface.

13. The light conduit of claim 7, wherein the light conduit assembly has an outer covering over a middle portion of the light conduit.

14. A nautical navigation redundant light system comprising:
   a light conduit, said light conduit structure comprising one bar or multiple bars, a proximal end operable to provide light coupling and mechanical coupling, and a middle portion whose combination of structure and material make it operable to efficiently conduct and confine light to the distal end;
   a base, said base comprising material suitable for nautical applications, a structure operable to mechanically couple the light conduit proximal end to a nautical navigation structure and operable to facilitate light coupling into the light conduit proximal end;
   primary and redundant light source or sources, each light source operable to project light into the light conduit proximal end, and comprising electrical to light energy conversion;
   primary and redundant light driver device or devices, each light driver device operable to connect to an electrical power source and one or multiple light sources, and comprising power conversion and control for one or multiple light sources;
   a redundant light control device comprising detection of primary light source failure and operable to enable the redundant light driver or drivers, light source or sources, or combinations thereof;
   and a reflective surface or surfaces in proximity or integral to the distal end of the light conduit bar or bars, said reflective surface comprising an angle-of-incidence to the conducted light operable to redirect and emit the light and a shape operable to emit light in the desired emission pattern.

15. The base of claim 14, wherein the mechanical coupling comprises a socket operable to receive the light conduit proximal end.

16. The primary and redundant light driver device or devices of claim 14, wherein the light driver device or devices comprises a switching power supply topology circuit.

17. The primary and redundant light source or sources of claim 14, wherein the light source or sources comprise a LED or LEDs.

18. The redundant light control device of claim 14, comprising a photodiode coupled to the primary source fight, au analog to digital converter and a microcontroller, said microcontroller operable to enable or disable the primary and redundant light driver device or devices, dependant on the detected primary light source light emission.

19. The light conduit of claim 14, wherein each light conduit bar incorporates a light barrier on a portion of the bar surface.

20. The light conduit of claim 14, wherein the light conduit assembly has an of covering over a middle portion of the light conduit.

* * * * *